United States Patent [19]

Mayer et al.

[11] Patent Number: 4,585,967
[45] Date of Patent: Apr. 29, 1986

[54] ROTOR OF AC DYNAMOELECTRIC MACHINE WITH IMPROVED COOLING AND STABILITY AND METHOD OF MAKING THE SAME

[75] Inventors: John A. Mayer, Clifton Park; William H. Miller, Albany, both of N.Y.

[73] Assignee: General Electric Company, Fort Wayne, Ind.

[21] Appl. No.: 671,368

[22] Filed: Nov. 14, 1984

Related U.S. Application Data

[63] Continuation of Ser. No. 544,145, Oct. 21, 1983, abandoned.

[51] Int. Cl.[4] ............................................. H02K 1/00
[52] U.S. Cl. ..................................... 310/217; 29/598; 310/42; 310/261; 310/216
[58] Field of Search ............. 310/42, 216, 217, 61-65, 310/162, 163, 261-265; 29/596-598

[56] References Cited

U.S. PATENT DOCUMENTS

| | | | |
|---|---|---|---|
| 1,158,463 | 11/1915 | Eaton | 310/217 X |
| 1,286,782 | 12/1918 | Ringland | 310/216 |
| 2,522,941 | 9/1950 | Gillen | 310/216 |
| 2,680,822 | 6/1954 | Brainard | 310/42 X |
| 3,234,419 | 2/1966 | Picozzi | 310/261 X |
| 4,028,568 | 6/1977 | Tatsumi et al. | 310/42 |
| 4,377,762 | 3/1983 | Tatsumi et al. | 310/42 |

Primary Examiner—Mark O. Budd
Attorney, Agent, or Firm—John M. Stoudt

[57] ABSTRACT

A shaft of a high-speed AC dynamoelectric machine includes axially directed flutes which define lands upon which an aligned stack of annular laminations of magnetic steel are shrunk-fit. The flutes concentrate contact forces generated by shrink-fitting in known positions and the non-contacting regions aligned with the flutes provide a small amount of resilience which permits thermal expansion of the rotor to occur without forcing a migration in the shrunk-fit contacting surfaces. The flutes may be used as axial ventilation holes whose effectiveness is enhanced by radially directed air flow channels communicating between the flutes and the outer surface of the rotor. In rotors using laminations which include keyways therein, the fluted shaft provides sufficient keying of the lamination to the shaft so that a key may be omitted. In order to avoid stacking of burrs in the laminations, succeeding groups of laminations are angularly indexed so that the effects of any recurring burrs are distributed about the circumference of the rotor and are thereby cancelled out.

6 Claims, 7 Drawing Figures

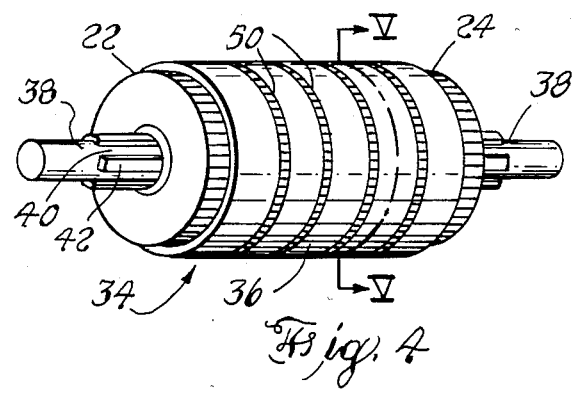
Fig. 4
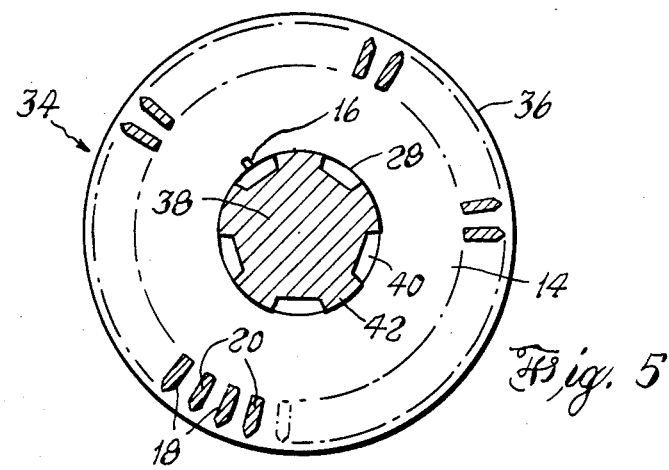
Fig. 5
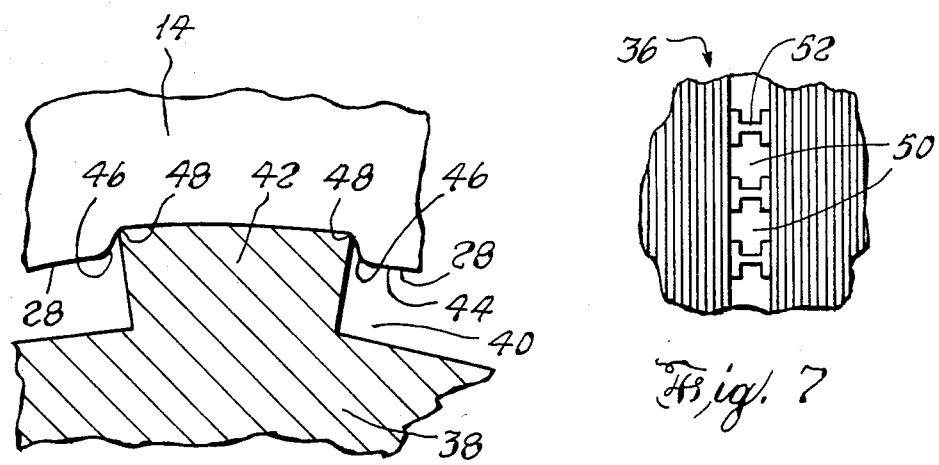
Fig. 6
Fig. 7

4,585,967

ROTOR OF AC DYNAMOELECTRIC MACHINE WITH IMPROVED COOLING AND STABILITY AND METHOD OF MAKING THE SAME

CROSS-REFERENCE TO RELATED APPLICATION

This application is a continuation of copending application Ser. No. 544,145 filed Oct. 21, 1983. now abandoned.

BACKGROUND OF THE INVENTION

The present invention relates to dynamoelectric machines and, more particularly, to rotors for such machines and to a method of making the same.

It has long been observed that the vibration of AC motors/generators appears to increase in amplitude as they heat up with applied load. One cause of such vibration appears to be a balance shift in the rotor as it heats up due to resistance losses in the rotor bars and eddy current losses in the magnetic steel laminations.

Rotors of large AC induction motors are conventionally formed by stacking thin laminations of magnetic steel on a mandrel, inserting rotor conductor bars in axial slots passing through the laminations, axially compressing the stack and welding the ends of the conductive rotor bars to end rings which then maintain the stack in its compressed condition. The rotor stack is fixedly mounted on a shaft both by a thermal shrink-fit and by a keyway in the stack and the shaft.

Rotors of large AC induction motors can be roughly categorized as slow-speed rotors which are suitable for slow-speed machines and high-speed rotors which are suitable for high-speed machines. Typically the outside diameter of a slow-speed rotor is relatively large. Such large diameter permits the inclusion of a plurality of axial cooling holes in the rotor and radial cooling slots communicating the axial cooling holes to the outer diameter of the rotor. The rotors of high-speed machines such as, for example, of two-pole induction motors which rotate at about 3600 RPM, are necessarily of substantially smaller diameter than those of slow-speed machines. In a smaller-diameter rotor, axial holes through the stacked magnetic steel laminations may adversely affect the magnetic properties of the rotor. Accordingly, it is conventional to build high-speed rotors as substantially solid stacks of laminations without either axial or radial cooling holes.

We have observed that rotor imbalance in high-speed induction motors appears to be more related to rotor temperature than is the case with the larger slow-speed rotors with cooling holes and slots. We have discovered that the shrink-fit contact pressure between the stacked laminations and the shaft is less evenly distributed and less uniform in the high-speed rotor. In addition, one type of imbalance we have observed in assembled high-speed rotors appears to be in consistent angular relationship with the keyway.

Although we do not intend to be bound by a particular theory of why the possible causes of thermally related imbalance appear to be aggravated in high-speed rotors, we propose the following theory.

During shrink fitting of the substantially solid (that is, one not containing axial cooling holes) stack to a shaft, the higher radial rigidity of the solid laminations produces a higher interface pressure on the shaft at some relatively uncontrolled locations with other locations and a relatively light interface pressure at other locations. When the rotor bars of a solid high-speed rotor expand and possibly shift locations slightly with increased temperature during operation, the contact pressure tends to become redistributed between high and low contact pressure regions. This produces a change in rotor balance. Such change in rotor balance occurring in operation this way takes place after the normal rotor balancing operations are completed and thus may lead to rotor vibration in the field.

Another cause of imbalance appears to arise from tiny burrs in the punchings in the vicinity of the keyway. Before assembly, the shaft is accurately straightened. The die used to punch the keyway in each punching tends to leave a consistent burr pattern in each lamination. When the laminations are stacked to form the stack, any consistent burrs formed at the keyway during fabrication are aligned along the axis to thus produce a greater stack length at the keyway than at other locations around the circumference of the stack. For example, if a burr only 0.0001 inch thick is present at the keyway on, for example, 1200 laminations, the assembled stack is longer by 0.12 inch in the vicinity of the keyway. When the end rings are welded to the rotor bars, this greater stack thickness along the keyway produces greater axial tension in the vicinity of the keyway and thus tends to bend the shaft. This bend is then locked in by the shrink fit. The shaft may again be straightened after assembly, but the bend remains in the shrink-fit contact area. Changes in tension by thermal expansion of the rotor bars combined with the non-uniform shrink-fit contact pressure can permit some of the laminations to migrate and to thereby deform the shaft and/or stack and cause its shape and balance to change relative to its condition upon completion of manufacturing. If the condition of shape and balance were to remain stable instead of changing, balancing at completion of manufacturing is capable of remedying the imbalance. It is the change of shape and/or balance that constitutes the major problem.

OBJECTS AND SUMMARY OF THE INVENTION

Accordingly, it is an object of the invention to provide a rotor of an AC dynamoelectric machine having improved characteristics and to provide an improved method of making the rotor.

It is a further object of the invention to provide a rotor for a dynamoelectric machine having an improved resistance to change in balance and to provide an improved method of manufacturing such rotor having the improved resistance to change.

It is a further object of the invention to provide a rotor for an AC dynamoelectric machine in which axially directed flutes on a shaft define lands upon which a stack of laminations of magnetic steel may be shrunk-fit. The lands provide controlled known contact area for the shrink-fit to make the contact forces more uniform and predictable.

According to an embodiment of the invention, there is provided a rotor for an AC dynamoelectric machine comprising a shaft, a plurality of flutes axially disposed in a surface of the shaft, portions of a surface of the shaft between said flutes forming a plurality of lands, a substantially cylindrical magnetic body on the shaft, the magnetic body including a stack of a plurality of substantially circular laminations on the shaft, each of the laminations including a substantially circular hole centered therein and the stack of all of the laminations being shrunk-fit onto the lands.

According to a feature of the invention, there is provided a method for shifting a resonance frequency of a rotor of an AC dynamoelectric machine, the rotor being of the type having a shaft including axially directed flutes in a surface thereof defining a plurality of lands therebetween and a stack of a plurality of laminations shrunk-fit onto the lands, comprising adjusting at least one of a depth of the flutes and a circumferential ratio of the flutes to the lands to a value effective to produce an equivalent diameter of the shaft which adjusts a stiffness of the shaft whereby the resonance frequency is shifted.

Briefly stated, the present invention provides a shaft of a high-speed AC dynamoelectric machine which includes axially directed flutes which define lands upon which an aligned circular stack of laminations of magnetic steel are shrunk-fit. The flutes concentrate contact forces generated by the shrink-fitting in known positions and the non-contacting regions aligned with the flutes provide a small amount of resilience which permits thermal expansion of the rotor to occur without forcing a migration in contact forces between the shrunk-fit contacting surfaces. The flutes may be used as axial ventilation passages whose effectiveness is enhanced by radially directed air flow channels communicating between the flutes and the outer surface of the rotor. In rotors using punchings which include keyways therein, the fluted shaft provides sufficient keying of the laminations to the shaft so that a key may be omitted. In order to avoid stacking of burrs in the laminations, succeeding groups of laminations are angularly indexed so that the effects of any recurring burrs are distributed about the circumference of the rotor and are thereby cancelled out.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a perspective view of a high-speed rotor according to an embodiment of the invention.

FIG. 5 is a cross section taken between adjacent punchings taken along V—V of FIG. 4.

FIG. 6 is an enlarged view of the portion of the cross section of FIG. 5 showing how the interface between lands of a fluted shaft and holes in a stack of laminations accomplish keying.

FIG. 7 is an enlarged side view of a portion of the high-speed rotor of FIG. 4 showing radial air flow channels.

DETAILED DESCRIPTION OF THE PREFERRED EMBODIMENT

Before beginning a description of the present invention, a brief description is given of a typical AC high-speed rotor of the prior art.

Figure 1:
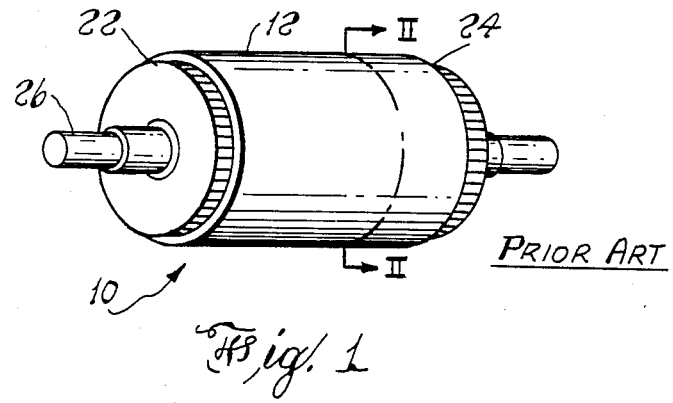
FIG. 1 is a perspective view of a high-speed rotor according to the prior art.
Figure 2:
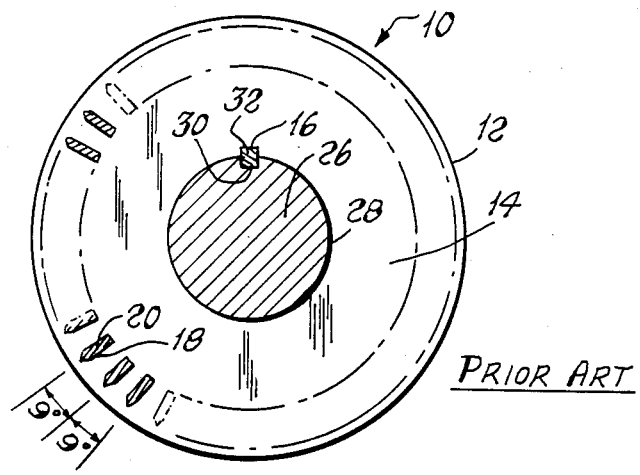
FIG. 2 is a cross section between adjacent laminations taken along II—II of FIG. 1.

Referring first to FIGS. 1 and 2, there is shown, generally at 10, a conventional high-speed rotor. High-speed rotor 10 includes a magnetic body 12 built up of a stack of thin laminations 14 of magnetic steel which are assembled on a mandrel rotationally aligned using a keyway 16 in each lamination 14. Equally spaced bar slots 18 receive rotor conductor bars 20 which extend beyond each end of magnetic body 12. A large high-speed rotor 10 may have several hundred to a thousand or more laminations 14. The stack formed of laminations 14 and rotor conductor bars 20 is axially compressed while the ends of rotor conductor bars 20 are welded to end rings 22 and 24 to thereby capture the assembly in the axially compressed condition. A shaft 26 passes through an axial hole formed by aligned circular holes 28 in each lamination 14. A keyway 30 in shaft 26 is aligned with keyway 16 in laminations 14 for insertion of a key 32. Besides key 32, a shrink-fit is employed to lock the mating surfaces of shaft 26 and lamination 14.

Due to the radial rigidity of each lamination 14, the shrink fit develops a large contact force at unpredictable locations with small or no contact force at other locations. When rotor conductor bars 20 expand due to heat during operation, the locations of the contact force may migrate from regions of high contact force to regions of lower contact force. This effect may be aggravated by a thermally induced balance shift due to migration of one or more of rotor conductor bars 20 in their respective bar slots 18.

Figure 3:
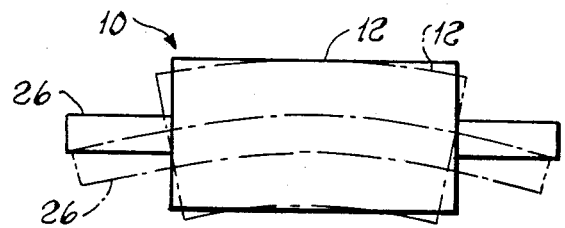
FIG. 3 is a side view of a high-speed rotor to which reference will be made in explaining one cause of rotor bending.

Keyways 16 in each lamination 14 also tend to bow high-speed rotor 10 during manufacture and to produce balance changes during operation. Laminations 14 may be formed by a cutter "punching" operation from a sheet metal in which case keyway 16 would tend to leave a small consistent burr in all of laminations 14. Although careful manufacturing practices are capable of reducing such burrs to as small as about 0.0001 inch (one ten-thousandth), when, for example, 1200 laminations 14 are stacked with their keyways 16 aligned, the axial dimension along the aligned keyways 16 of high-speed rotor 10 is 0.12 inch longer than the axial dimension 180 degrees away from this location. The net effect is a greater tension in the assembled magnetic body 12. Referring now to FIG. 3, when magnetic body 12 is shrunk fit to shaft 26, the greater tension produced by the aligned burrs tends to bend magnetic body 12 and shaft 26 during cooling (shown highly exaggerated). The bend is locked in by the shrink fit. Thus shaft 26, which was originally accurately manufactured straight, is bent into the curved shape indicated by the dashed line. As a result of the misalignment of the ends of shaft 26, these ends must be straightened after assembly of high-speed rotor 10. Besides requiring additional manufacturing time for final straightening, the situation just described tends to produce temperature-related balance change. The locked-in force of bent shaft 26 pulling against the extra tension along keyway 16 tends to permit changes in the shape of high-speed rotor 10 as rotor conductor bars 20 expand and contract with temperature change. The variability of contact pressure of the shrink-fit accommodates the tendency for migration of contact.

From FIGS. 1 and 2 it will be noted that there is no provision for permitting cooling air to flow axially or radially within magnetic body 12. Thus, discharging heat produced by current in rotor conductor bars 20 and eddy current losses in magnetic body 12 depends on the relatively inefficient cooling from the rotor surface. This permits relatively high temperatures to develop within magnetic body 12 thereby aggravating the observed phenomenon of temperature-induced balance shift.

Referring now to FIGS. 4 and 5, there is shown, generally at 34 a high-speed rotor according to the present invention. A magnetic body 36 is a stack of laminations 14, captured by end rings 22 and 24 welded to the ends of rotor conductor bars 20 inserted through bar slots 18. Magnetic body 36 is shrunk fit onto a shaft 38. Although no key is used for fixing laminations 14 to shaft 38, convenience in manufacturing laminations 14 makes it desirable to include a keyway 16 in each lamination 14.

The portion of the peripheral surface of shaft 38 upon which shrunk-fit contact is to be made by the periphery of circular hole 28 of laminations 14 includes a plurality of axially directed flutes 40 shown in the form of flat surfaces separated by remaining axial cylindrical surface portions herein referred to as lands 42. Shrunk-fit contact between shaft 38 and laminations 14 is limited to the predetermined defined surface areas defined by lands 42. Flutes 40 between adjacent lands 42 tend to soften the contact and permit more even distribution of contact force to develop during the shrink fit. Since they more precisely define the contact area and add some resilience to the fit between circular hole 28 and shaft 38, flutes 40 tend to reduce the tendency for migration of the contact areas with temperature. Since flutes 40 have a negligible influence on the magnetic characteristics of magnetic body 36, removal of material to form flutes 40 has negligible influence on the magnetic performance of high-speed rotor 34.

The number of flutes 40 which may be employed is preferably selected to have a minimum interaction with any known excitation mechanism. If two flutes 40 were selected, for example, this would correspond to an out-of-round condition of shaft 38 which would align a weak axis of shaft 38 with the weight vector of high-speed rotor 34 twice per revolution and this is a condition which is known to provide excitation at twice the rotational frequency of a rotor. To avoid most of the known troublesome frequencies and their lower order harmonics, the number of flutes 40 should at least be more than three, should be an odd number and should preferably be a prime "number." As best seen in FIG. 5, five was chosen as the preferred number of flutes 40 (and consequently, there are five lands. 42 each being about the same peripheral dimension) but other numbers may be chosen for other applications. The ratio of land 42 to flute 40 may be selected to provide a desired contact pressure.

For convenience in measuring the outside diameter of lands 42, in the illustrated embodiment we have made the total contact pressure surfaces of lands 42 the total contact pressure surface on the five-fluted shaft occupy slightly more than 50 percent, for example, 56 percent of the total 360 circumference of shaft 38 so that a diameter is always available for measurement at each end of each land 42. Thus, The ratio of lands to flutes in the preferred embodiment is 56%/44% or 1.27.

The foregoing description defines an embodiment of the invention which, by itself, offers a substantial solution to the balance problems of high-speed rotors for AC dynamoelectric machines. If desired, a keyway (not shown) could be provided in shaft 38 to engage a key (not shown) and align bar slots 18 in laminations 14.

Referring to FIG. 6, however, an enlarged view of the contact area between one of lands 42 and a portion of the inner periphery of a stack of laminations 14 at circular hole 28 along with adjacent portions of flutes 40 shows why a key can be eliminated. Portions of the laminations 14 in contact with lands 42 are compressed, or forced outward, by the contact force of the shrink-fit between them. Portions 44 of laminations 14, not in contact with lands 42, form inward bulges 46 protruding a short distance into flutes 40. In effect, this forms a keyed connection between the mating parts which resists any tendency for relative rotational motion therebetween. To further enhance the keying action, outer corners 48 are left sharp.

With the need for a key eliminated, attention can be turned to the problem of burrs on keyway 16. One solution, of course, includes elimination of keyway 16 altogether since it no longer contributes to the operation of the apparatus. As mentioned above, manufacturing convenience encourages retaining keyway 16. It is no longer required, however, to maintain alignment between keyways 16 throughout the length of magnetic body 36. Instead, in a preferred embodiment, keyways 16 are indexed around the circumference of flute 40 so that, instead of all of their burrs becoming stacked along a single line, they are uniformly distributed about the circumference of magnetic body 36 and their influence on bending magnetic body 36 and shaft 38 average out to zero. In one embodiment of the invention, bar slots 18 and rotor conductor bars 20 are disposed at equal angles of about 9 degrees about the circumference of magnetic body 36. There are thus 40 angular positions which can be assumed by a lamination 14. If there are, for example, 1200 laminations 14 in magnetic body 36, each lamination 14 may be indexed 9 degrees with respect to the preceding stacked lamination 14. Rather than index each succeeding lamination, we stack small groups of laminations 14 at each index position before going on to the next small group. For example, a group of six laminations 14 may be stacked at the same index angle and then the next group may be stacked at the next index angle. Succeeding index angles may follow a smooth rotational progression with each group being indexed 9 degrees from its predecessor. Alternately, more complex indexing sequences may be employed. The principal requirement is that the influence of burrs formed during the manufacturing of laminations 14 be distributed about the circumference of shaft 26 rather than being allowed to pile up their tolerances along a single line.

The two foregoing items, namely the fluted shaft and the distribution of tolerances of laminations 14, solve the major problems of thermally induced vibrational change as well as substantially reducing the manufacturing labor heretofore required to straighten the shaft bent by the aligned burrs of laminations 14. However, the existence of flutes 40 makes it possible to apply even further improvements.

Flutes 40 may be thought of as axial air channels permitting the passage of air into the interior of high-speed rotor 34. In order to provide air flow, the stack of laminations 14 is periodically interrupted by radial air flow channels 50 which communicate between flutes 40 and the exterior of magnetic body 36. Radial air flow channels 50 may be of any convenient type such as the type shown in FIG. 7 wherein radially disposed I sections 52 separate adjacent portions of magnetic body 36 to leave radial air flow channels 50. The provision of radial air flow channels 50 also provides a small amount of resilience in the axial direction to permit unbalanced forces, developed either during the stacking or the shrink-fitting process, to equalize. In order to maximize this equalization tendency in one preferred embodiment, we make the spacing between adjacent regions containing radial air flow channels 50 approximately equal to the radial thickness of magnetic body 36.

As previously noted, the presence of flutes 40 makes practically no difference in the magnetic performance of high-speed rotor 34. Thus, the depth and/or width of flutes 40 may be varied as desired within limits. If the depths of flutes 40 is increased, it has an effect equivalent to reducing the effective diameter of shaft 38 to a value intermediate the diameters taken at lands 42 and at the bottoms of flutes 40. This has the effect of changing the stiffness and resulting resonance frequencies of the high-speed rotor 34 system. Thus, if a troublesome resonance arises in a given application, the depths or shape of flutes 40 may be changed as necessary to shift the rotor critical speed without requiring a new electrical design or a new lamination.

While we have shown flutes 40 to be in the shape of chord-like flats axially disposed along the surface of shaft 36 other shapes are possible. Thus, for example, flutes 40 may have a curved surface so as to minimize the sharpness of the interface between the lands and the flutes to reduce stresses in the shaft 36. Similarly, this angle may be increased to increase the keying effect of the lands.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A rotor for an AC dynamoelectric machine comprising:
    a shaft including a plurality of flutes extending axial a surface of said shaft, with portions of the surface between said flutes forming a plurality of lands;
    a stack of substantially annular laminations having an axial hole extending therethrough and having a substantial number of laminations shrunk-fit on said lands;
    the total circumferential surface of said lands when divided by the total circumferential surface of said shaft being about 50 percent.

2. A rotor for an AC dynamoelectric machine comprising:
    a shaft having a plurality of flutes extending axially through a part of the shaft and in communication with an outer surface of said shaft, portions of the outer surface of said shaft between adjacent flutes forming a plurality of angularly spaced apart lands;
    a stack of substantially annular laminations having an axial hole extending therethrough and having a substantial number of laminations shrunk-fit on said lands;
    said plurality of flutes includes five flutes defining five lands and a circumferential ratio of said lands to said flutes exceeds 0.50.

3. A rotor according to claim 2 wherein all of said five lands have a substantially equal circumferential dimension and all of said flutes have an equal circumferential dimension.

4. Apparatus for shifting a resonance frequency of a rotor of an AC dynamoelectric machine, said rotor being of the type having a shaft including axially directed flutes in a surface thereof defining a plurality of lands therebetween and a stack of a plurality of laminations all of which are shrunk-fit onto said lands, comprising:
    means for changing an equivalent diameter of said shaft to a value which adjusts a stiffness of said shaft effective to shift said resonance frequency of said shaft; and
    said means for changing including a change in at least one of a depth of said flutes and a circumferential ratio of said flutes to said lands.

5. The invention according to claim 4 further comprising a plurality of radial air flow channels communicating substantially radially between said flutes and an outer surface of said rotor whereby axial air flow through said flutes and through said radial air flow channels is enabled.

6. The invention according to claim 5 wherein said plurality of radial air flow channels include at least first and second radial air flow channels, an axial spacing between said first and second air flow channels being about equal to a radial thickness of said stack of laminations.

* * * * *